(12) United States Patent
Kanbe

(10) Patent No.: US 6,736,025 B2
(45) Date of Patent: May 18, 2004

(54) VEHICULAR FOOT-OPERATED PARKING BRAKE CONTROL APPARATUS

(75) Inventor: Kazunari Kanbe, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/989,445

(22) Filed: Nov. 21, 2001

(65) Prior Publication Data

US 2003/0094069 A1 May 22, 2003

(30) Foreign Application Priority Data

Nov. 21, 2000 (JP) ........................................ 2000-354207

(51) Int. Cl.[7] ................................................. G05G 5/18
(52) U.S. Cl. ........................................ 74/535; 74/577 S
(58) Field of Search ........................... 74/560, 535, 578, 74/577 R, 577 S, 57 S

(56) References Cited

U.S. PATENT DOCUMENTS

| | | | | |
|---|---|---|---|---|
| 2,467,557 A | * | 4/1949 | Jandus | ........................ 74/535 |
| 3,511,107 A | * | 5/1970 | Yasiro | .......................... 74/512 |
| 4,519,270 A | * | 5/1985 | Kawaguchi et al. | .......... 74/535 |
| 5,217,094 A | * | 6/1993 | Walter et al. | ................ 188/2 D |

FOREIGN PATENT DOCUMENTS

| | | | | |
|---|---|---|---|---|
| EP | 527518 A1 | * | 2/1993 | ........... B60T/07/04 |
| JP | 10264787 A | * | 10/1998 | ........... B60T/07/06 |
| JP | 2967406 B2 | | 8/1999 | |

* cited by examiner

*Primary Examiner*—Chong H. Kim
(74) *Attorney, Agent, or Firm*—Burns, Doane, Swecker & Mathis, LLP

(57) ABSTRACT

A vehicular foot-operated parking brake control apparatus includes a mounting bracket and a pedal arm that is rotatably mounted on the bracket. The bracket is provided with a plurality of ratchet teeth and a pawl is rotatably mounted on the pedal arm for rotation between a first rotational position in which the pawl is engaged with the ratchet teeth and a second rotational position in which the pawl is disengaged from the ratchet teeth. The pawl is slidably mounted on the pedal arm to slide between a first slide position and a second slide position. The apparatus is designed to allow the parking brake to be engaged and disengaged by depressing the pedal arm.

15 Claims, 4 Drawing Sheets

VEHICULAR FOOT-OPERATED PARKING BRAKE CONTROL APPARATUS

This application is based on and claims priority under 35 U.S.C. 119 with respect to a Japanese Patent Application 2000-354207 filed on Nov. 21, 2000, the entire content of which is incorporated herein by reference.

FIELD OF THE INVENTION

The present invention generally relates to a vehicle parking brake. More particularly, the present invention pertains to a foot-operated parking brake control apparatus for vehicles that permits the parking brake to be released by performing the same operation as that performed to effect activation of the parking brake.

BACKGROUND OF THE INVENTION

A known vehicular foot-operated parking brake control apparatus is disclosed in Japanese Patent Publication No. 2967406. In this apparatus, a pawl for locking a pedal arm by engagement with a plurality of ratchet teeth provided on the pedal arm is rotatably supported on a bracket by a pin so as to be able to slide a predetermined amount in the rotational direction of the pedal arm. A release lever which is adapted to engage the pawl is rotatably supported on the bracket by a pin. A spring is disposed between the pawl and the release lever and the urging direction of the spring against the pawl and the release lever is changed in response to the rotation of the pedal arm.

That is, when the parking brake is not operated, the spring urges the pawl so that the pawl engages the ratchet teeth and simultaneously the spring urges the release lever so that the release lever is separated from the ratchet teeth. When the pedal is depressed and the pedal arm is rotated, the pedal is prevented from returning by the engagement between the pawl and the ratchet teeth and the operation of the parking brake is maintained. At this time, when the depressing force is removed, the pawl slides with a predetermined amount toward the returning side of the pedal and the release lever is rotated close to the ratchet teeth. Thereby, the urging direction of the spring is changed and the spring urges the pawl to separate from the ratchet teeth. Simultaneously, the spring urges the release lever close to the ratchet teeth. In this operating condition of the parking brake, when the pedal is depressed and the pedal arm is rotated, the engagement between the pawl and the ratchet teeth is released and the pawl is rotated to separate from the ratchet teeth. Thereby, the return of the pedal arm is allowed and the operation of the parking brake is released.

In the above-described apparatus, however, because the ratchet teeth are provided on the pedal arm, and the pawl and the release lever are mounted on the bracket, the size of the bracket is increased. As a result, the size of the overall parking brake control apparatus increases and a large space is required for mounting the parking brake control apparatus. This problem becomes more significant if the distance between the arc of the ratchet teeth and the rotational axis of the pedal arm is increased for lessening the stroke loss due to the return of the pedal arm when the depressing force is removed after operating the parking brake.

A need thus exists for an improved vehicular foot-operated parking brake control apparatus which is not as susceptible to the drawbacks mentioned above.

SUMMARY OF THE INVENTION

In light of the foregoing, the vehicular foot-operated parking brake control apparatus according to the present invention includes a mounting bracket adapted to be fixed to the vehicle body, a pedal arm rotatably mounted on the bracket for rotation about a rotational axis and being connected to a parking brake control cable, a plurality of ratchet teeth provided on the bracket along an arc disposed about the rotational axis of the pedal arm, and a pawl rotatably mounted on the pedal arm for rotation about a rotational axis between a first rotational position in which the pawl is engaged with one of the ratchet teeth and a second rotational position in which the pawl is disengaged from the ratchet teeth. The rotational axis of the pawl is generally parallel to the rotational axis of the pedal arm, and the pawl is slidably mounted on the pedal arm in the rotational direction of the pedal arm to slide between a first slide position and a second slide position. In addition, a release lever is rotatably mounted on the pedal arm for rotating about a rotational axis that is generally parallel to the rotational axis of the pedal arm to turn between a release rotational position and a non-release rotational position. A spring having a first end connected to the pawl and a second end connected to the release lever imparts a spring force that constantly urges the pawl to slide towards the first slide position. The spring urges the release lever to stay in the non-release rotational position and urges the pawl to turn towards the first rotational position when the release lever is in the non-release position, and urges the release lever to stay in the release rotational position and urges the pawl to turn towards the second rotational position when the release lever is in the release rotational position. A first cooperating mechanism is provided between the pawl and the release lever for turning the release lever from the non-release rotational position to the release rotational position when the pawl is moved from the first slide position to the second slide position, and a second cooperating mechanism is provided between the release lever and the pedal arm for turning the release lever from the release rotational position to the non-release rotational position when the pedal arm is turned from a parking brake engaging position to a parking brake disengaging position.

According to another aspect of the invention, a vehicular foot-operated parking brake control apparatus includes a mounting bracket adapted to be fixed to a vehicle body, a pedal arm rotatably mounted on the bracket for moving between a parking brake disengaging position and a parking brake engaging position, a plurality of ratchet teeth provided on the bracket, and a pawl rotatably mounted on the pedal arm for rotation between a first rotational position in which the pawl is engaged with one of the ratchet teeth and a second rotational position in which the pawl is disengaged from the ratchet teeth, with the pawl being mounted on the pedal arm by way of an elongated hole for slidably moving between a first slide position and a second slide position. A release lever is rotatably mounted on the pedal arm for rotating between a release rotational position and a non-release rotational position. A spring has a first end connected to the pawl and a second end connected to the release lever to urge the release lever towards the non-release rotational position while urging the pawl towards the first rotational position before the pedal arm is rotated from the parking brake disengaging position to the parking brake engaging position, and for urging the release lever towards the release rotational position and urging the pawl towards the second rotational position when the pedal arm is in the parking brake engaging position.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
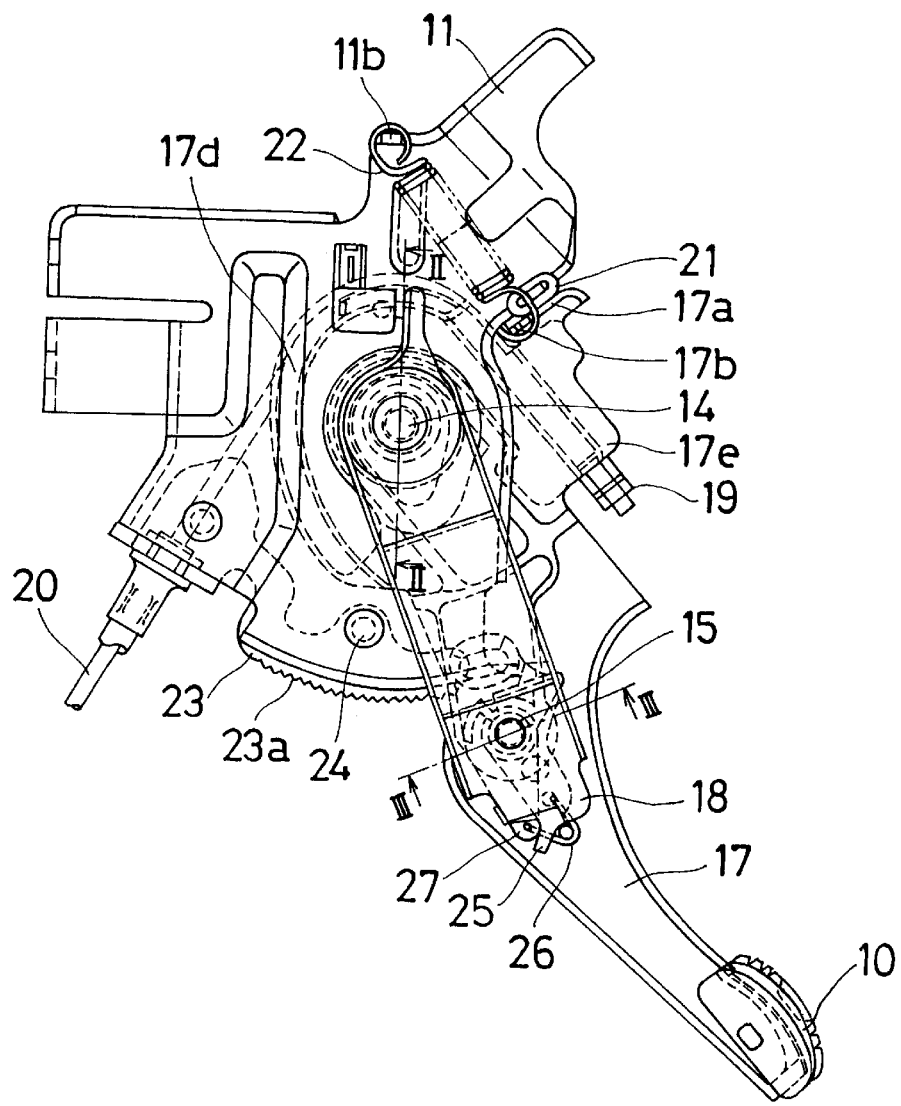
FIG. 1 is a side view of the foot-operated parking brake control apparatus of the present invention.
Figure 2:
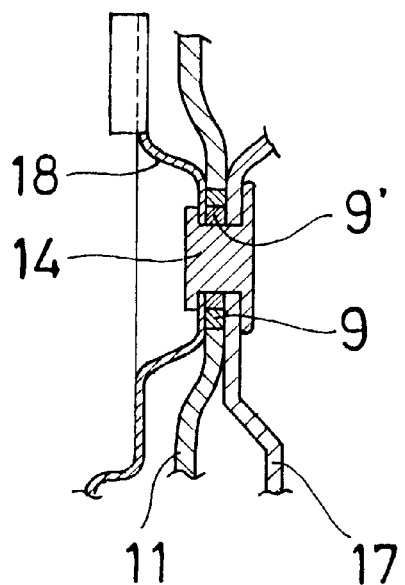
FIG. 2 is a cross-sectional view of the foot-operated parking brake control apparatus taken along the section line II—II of FIG. 1.

Referring to FIGS. 1 and 2, the foot-operated parking brake control apparatus includes a main pedal arm 17 and an auxiliary pedal arm 18 which are pivoted on a mounting bracket 11 by an axial or axis member 14 so as to be rotatable together as a unit. The mounting bracket is adapted to be fixed to the vehicle body. The main pedal arm 17 is shown in the rear of or behind the bracket 11 in FIG. 1 and the auxiliary pedal arm 18 is shown in front of the bracket 11 in FIG. 1. As shown in FIG. 2, the main and auxiliary pedal arms 17, 18 are configured to nip the bracket 11 so that the bracket 11 is located between the main pedal arm 17 and the auxiliary pedal arm 18. The main pedal arm 17 and the auxiliary pedal arm 18 are connected by a connection pin 15. As shown in FIG. 2, a pair of curlers 9, 9' is also provided.

A pedal pad 10 is fixed to one end of the main pedal arm 17. The opposite end of the main pedal arm 17 is provided with a groove portion 17d which opens outward. A parking brake control cable 20 is wound in the groove portion 17d. One end of the parking brake control cable 20 is connected to a mounting portion 17e of the main pedal arm 17 by a double nut 19. The other end of the parking brake control cable 20 is operatively connected to a wheel brake mechanism.

When the main and auxiliary pedal arms 17, 18 are pivoted about the axis member 14 in the clockwise direction in FIG. 1, the wheel brake mechanism is operated to effect activation or setting of the parking brake. The main and auxiliary pedal arms 17, 18 are urged by a return spring 22 to rotate in the counterclockwise direction in FIG. 1. The return spring 22 is interposed between an engaging portion 11b of the bracket 11 and an engaging portion 17b of the main pedal arm 17. The rotation of the main and auxiliary pedal arms 17, 18 in the counterclockwise direction in FIG. 1 is restricted by an abutting portion 17a of the main pedal arm 17 that abuts a stopper 21. The stopper 21 is preferably formed of rubber and is fixed to the bracket 11.

A sector member 23 having a plurality of ratchet teeth 23a is fixed to the lower part of the bracket 11 by a connection pin 24. The lower part of the bracket 11 is located in the locus of swinging motion of the main pedal arm 17 about the axis member 14. A pawl 25 is supported on the main pedal arm 17 so as to be rotatable around the connection pin 15. The pawl 25 is adapted to rotate about a rotational axis that is generally parallel to the rotational axis of the pedal arm 17. As shown in FIGS. 4–7 the pawl 25 has a hook 25a that is engageable with the ratchet teeth. The ratchet teeth 23a are formed along a circular arc disposed about the axis of the axial member 14.

Figure 3:
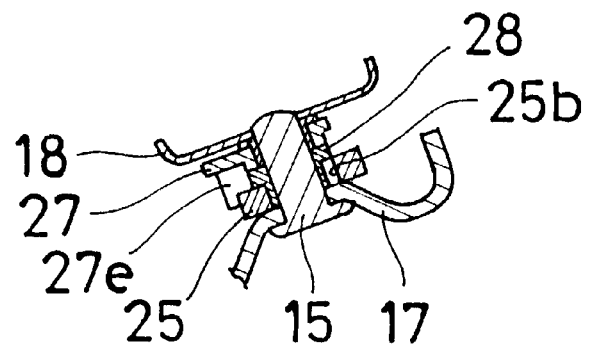
FIG. 3 is a cross-sectional view of the foot-operated parking brake control apparatus taken along the section line III—III of FIG. 1.

As shown in FIGS. 1 and 3, the pawl 25 and a release lever 27 are pivoted by the connection pin 15 connecting the main and auxiliary pedal arms 17, 18 through a curler 28. The pawl 25 is able to be turned or moved between a first rotational position as illustrated in FIG. 5 where the hook 25a of the pawl 25 is engaged with one of the ratchet teeth 23a and a second rotational position shown in FIG. 7 where the hook 25a of the pawl 25 is released or disengaged from the ratchet teeth 23a. The connection pin 15 is generally parallel to the axial member 14. A hole 25b in the pawl 25 through which the connection pin 15 extends is elongated in the rotational direction of the main pedal arm 17. This allows the pawl 25 to be slidably moved between a first slide position shown in FIGS. 4 and 5 and a second slide position shown in FIGS. 6 and 7.

A torsion spring 26 urges the pawl 25 to turn selectively towards either the first rotational position or the second rotational position and also constantly urges the pawl 25 to slide towards the first slide position. The torsion spring 26 has a first end 26a shown in FIG. 4 that is connected to or engaged with a hole 25c in the pawl 25 and a second end 26b that is connected to or engaged with a hole 27a in the release lever 27.

The pawl 25 is provided with a long arm 25A and a short arm 25B. The direction of elongation of the long arm 25A is generally at a right angle with respect to the direction of elongation of the hole 25b. The long arm 25A also extends toward the pedal pad 10 in the longitudinal direction of the main pedal arm 17. The short arm 25B extends in the opposite direction from the hole 25b with respect to the long arm 25A. The hole 25c is formed on the end of the long arm 25A and the hook 25a is formed on the end of the short arm 25B.

The release lever 27 is movably or rotatably mounted on the pedal arm 17 for rotating about a rotational axis that is generally parallel to the rotational axis of the pedal arm 17. The release lever 27 has a long arm 27b and a short arm 27c. The long arm 27b extends toward the pedal pad 10 in the longitudinal direction of the main pedal arm 17. The short arm 27c extends in the opposite direction from the connection pin 15 with respect to the long arm 27b. The hole 27a is formed on the end of the long arm 27b. The release lever 27 is pivotable between a non-release position shown in FIGS. 4 and 5 and a release position shown in FIGS. 6 and 7.

As shown in FIGS. 4–7, the short arm 25B of the pawl 25 is provided with an abutting portion 25d. The short arm 27c of the release lever 27 is outfitted with a projecting portion 27e against which abuts the abutting portion 25d of the pawl 25. The release lever 27 is turned from the non-release position shown in FIGS. 4 and 5 to the release position shown in FIGS. 6 and 7 when the pawl 25 is slid from the first slid position shown in FIGS. 4 and 5 to the second slide position shown in FIGS. 6 and 7.

As illustrated in FIGS. 4–7, the bracket 11 is provided with an abutting portion 11a which can contact the top end of the short arm 27c of the release lever 27 at the normal position of the main pedal arm 17. The release lever 27 is thus turned from the release position shown in FIGS. 6 and 7 to the non-release position by the main pedal arm 17.

The operation of the disclosed embodiment of the foot-operated parking brake control apparatus is as follows.

Figure 4:
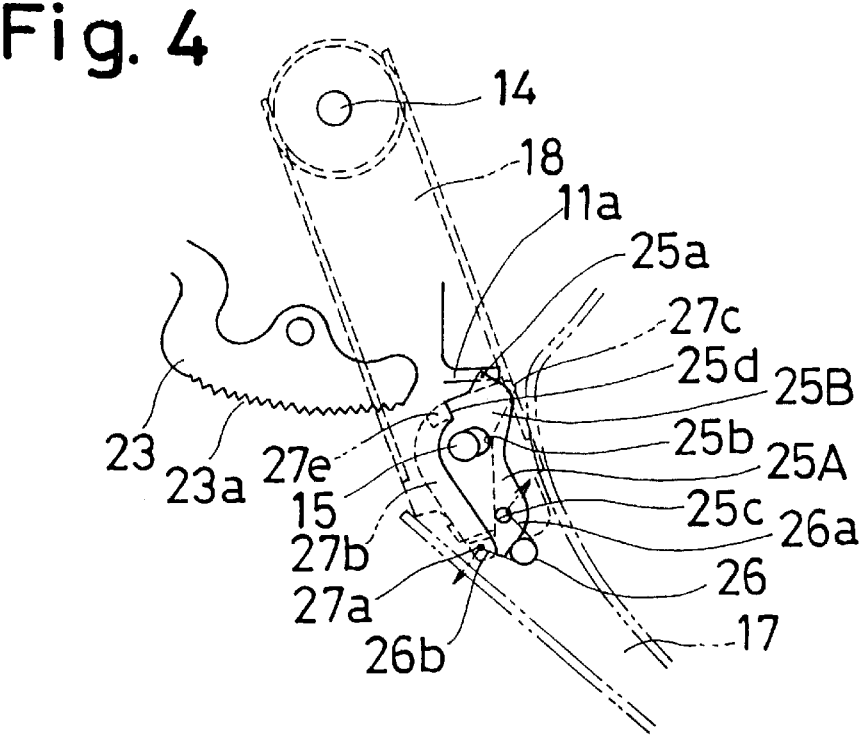
FIG. 4 is a side view of a portion of the parking brake with the parking brake released.
Figure 5:
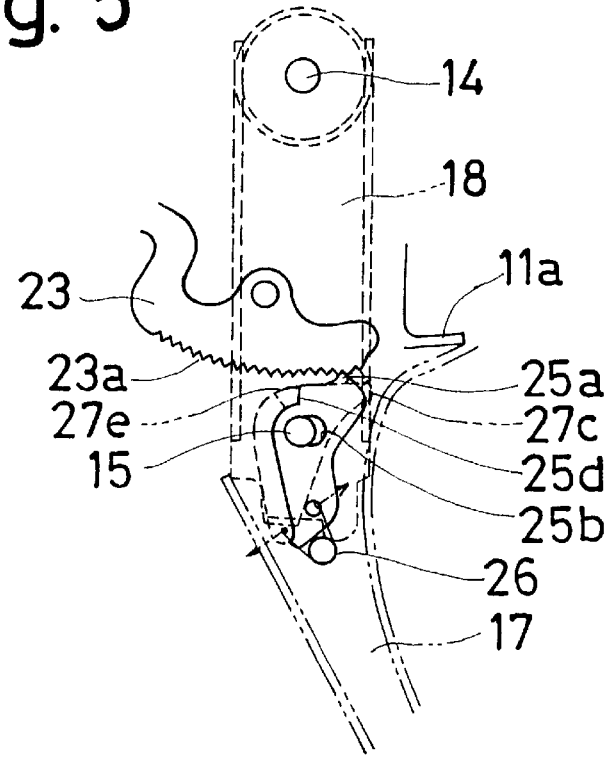
FIG. 5 is a side view of a portion of the parking brake with the parking brake pedal depressed.

FIGS. 1 and 4 show the state in which the parking brake mechanism is not actuated. When the main pedal arm 17 is depressed to effect actuation of the parking brake, the main pedal arm 17 and the auxiliary pedal arm 18 turn about the axial member 14 in the clockwise direction in FIGS. 1 and 4, thereby pulling the cable 20 to operate the wheel brake. During the turning of the pedal arm 17, the hook 25a of the pawl 25 which is urged to turn towards the first rotational position by the torsion spring 26 engages one of the ratchet teeth 25a depending upon the degree of depression of the pedal arm 17. The thus established state is illustrated in FIG. 5.

Figure 6:
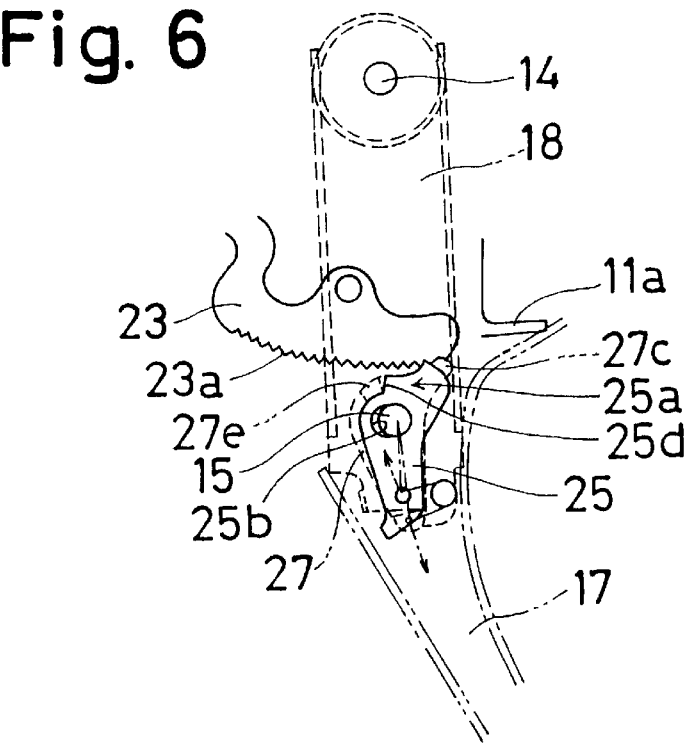
FIG. 6 is a side view of a portion of the parking brake with the depressing force on the parking brake pedal removed.

In the position shown in FIG. 5, the depressing force is still acting on the parking brake arm 17. When the depressing force is then removed, the pawl 25 engaged with the ratchet teeth 23a slides from the first slide position to the second slide position shown in FIG. 6 by the reaction force transmitted to the pedal arm 17 from the wheel brake by the parking brake control cable 20. The pedal arms 17, 18 simultaneously turn counterclockwise to the location shown in FIG. 6. As the pawl 25 slides from the first slide position in FIG. 5 to the second slide position in FIG. 6, the abutting portion 25d of the pawl 25 abuts against and pushes the projecting portion 27e of the release lever 27, thus turning the release lever 27 from the non-release position depicted in FIG. 5 to the release position shown in FIG. 6. When the release lever 27 is turned to the release position, the posture or orientation of the torsion spring 26 is changed as shown in FIG. 6. Although the torsion spring 26 now urges the pawl 25 to turn towards the second rotation position, the pawl 25 is held in the first rotational position because the hook 25a is firmly engaged with the ratchet teeth 23a by the reaction force transmitted to the pedal arms 17, 18 from the wheel brake. The parking brake is thus activated.

As described above, the direction in which the torsion spring 26 urges the pawl 25 switches over when the pawl 25 slides from the first slide position to the second slide position. Although the displacement of the second end 26b of the torsion spring 26 should preferably be large to ensure reliable switching of the urging direction, the amount of sliding of the pawl 25 should preferably also be minimized because the sliding movement of the pawl 25 reduces the effect of the parking brake. With the motion of the release lever 27 in accordance with present invention, a minimum amount of sliding movement of the pawl 25 provides a significantly increased displacement of the second end 26b of the torsion spring 26.

In this embodiment, the sector member 23 is fixed to the lower part of the bracket 11 which is located in the locus of the swinging motion of the main pedal arm 17. Therefore, it is possible to miniaturize the size of the bracket 11. Further, it is possible to increase the distance between the axial member 14 and the arc of the ratchet teeth 23a without requiring large space for mounting the apparatus and loss stroke can be decreased.

Figure 7:
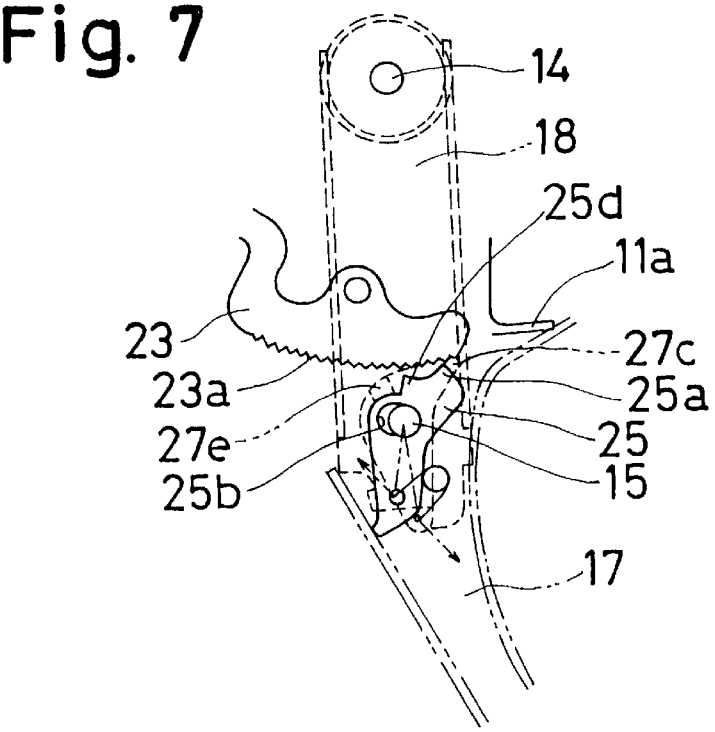
FIG. 7 is a side view of a portion of the parking brake with the parking brake pedal being depressed once again.

When the main pedal arm 17 is depressed again to release the parking brake, the force that firmly engages the hook 25a of the pawl 25 with the ratchet teeth 23a is canceled so that the pawl 25 is turned to the second rotation position shown in FIG. 7, thus releasing the hook 25a from the ratchet teeth 23a. Then, upon removing the depressing force on the pedal arm 17, the pedal arm 17 is turned counterclockwise to the initial or home position shown in FIGS. 1 and 4 by the reaction force from the wheel brake mechanism and the force from the return spring 22. As the pedal arm 17 returns to the home position, the abutting portion 11a of the bracket 11 abuts and pushes the top end of the short arm 27c of the release lever 27 to turn the release lever 27 from the release position shown in FIG. 7 to the non-release position shown in FIG. 4. In turn, as the release lever 27 turns from the non-release position to the release position, the elastic restoration force of the torsion spring 26 which constantly urges the pawl 25 towards the first slide position in FIG. 4 is increases to slide the pawl 25 from the second slide position shown in FIG. 7 to the first slide position.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicular foot-operated parking brake control apparatus comprising:

a mounting bracket adapted to be fixed to a vehicle body;

a pedal arm rotatably mounted on the bracket for rotation about a rotational axis, the pedal arm being connected to a parking brake control cable;

a plurality of ratchet teeth provided on the bracket along an arc disposed about the rotational axis of the pedal arm;

a pawl rotatably mounted on the pedal arm for rotation about a rotational axis between a first rotational position in which the pawl is engaged with one of the ratchet teeth and a second rotational position in which the pawl is disengaged from the ratchet teeth, the rotational axis of the pawl being generally parallel to the rotational axis of the pedal arm, the pawl also being slidably mounted on the pedal arm in the rotational direction of the pedal arm to slide between a first slide position and a second slide position;

a release lever rotatably mounted on the pedal arm for rotating about the rotational axis of the pawl to turn between a release rotational position and a non-release rotational position;

a spring having a first end connected to the pawl and a second end connected to the release lever, the spring imparting a spring force to the pawl that constantly urges the pawl to slide towards the first slide position, the spring urging the release lever to stay in the non-release rotational position and urging the pawl to turn towards the first rotational position when the release lever is in the non-release position, and the spring urging the release lever to stay in the release rotational position and urging the pawl to turn towards the second rotational position when the release lever is in the release rotational position;

first cooperating means provided between the pawl and the release lever for turning the release lever from the non-release rotational position to the release rotational position when the pawl is moved from the first slide position to the second slide position; and second cooperating means provided between the release lever and the pedal arm for turning the release lever from the release rotational position to the non-release rotational position when the pedal arm is turned from a parking brake engaging position to a parking brake disengaging position.

2. The vehicular foot-operated parking brake control apparatus according to claim 1, wherein the pawl is pivoted by the rotational axis through an elongated hole and has a long arm extending toward generally at a right angle with respect to a direction of elongation of the elongated hole, the release lever being provided with an arm extending in a longitudinal direction of the pedal arm, the first end of the spring being connected to the long arm of the pawl and the second end of the spring being connected to the arm of the release lever.

3. The vehicular foot-operated parking brake control apparatus according to claim 1, wherein the ratchet teeth are formed on a member that is fixed to a lower part of the mounting bracket by a connection pin.

4. The vehicular foot-operated parking brake control apparatus according to claim 1, wherein the pedal arm includes a main pedal arm and an auxiliary pedal arm connected to one another by a connection pin.

5. The vehicular foot-operated parking brake control apparatus according to claim 4, wherein the pawl and the release lever are mounted on the pedal arm by way of the connection pin.

6. A vehicular foot-operated parking brake control apparatus comprising:

a mounting bracket adapted to be fixed to a vehicle body;

a pedal arm rotatably mounted on the bracket for moving between a parking brake disengaging position and a parking brake engaging position;

a plurality of ratchet teeth provided on the bracket;

a pawl rotatably mounted on the pedal arm for rotation about a rotational axis of the pawl between a first rotational position in which the pawl is engaged with one of the ratchet teeth and a second rotational position in which the pawl is disengaged from the ratchet teeth, the pawl being mounted on the pedal arm by way of an elongated hole for slidably moving between a first slide position and a second slide position;

a release lever rotatably mounted on the pedal arm for rotating about the rotational axis of the pawl to turn between a release rotational position and a non-release rotational position; and a spring having a first end connected to the pawl and a second end connected to the release lever to urge the release lever towards the non-release rotational position while urging the pawl towards the first rotational position before the pedal arm is rotated from the parking brake disengaging position to the parking brake engaging position, and the spring urging the release lever towards the release rotational position and urging the pawl towards the second rotational position when the pedal arm is in the parking brake engaging position.

7. The vehicular foot-operated parking brake control apparatus according to claim 6, wherein the pawl includes an abutting portion which engages the release lever when the pawl moves from the first slide position to the second slide position to rotate the release lever from the non-release rotational position to the release rotational position.

8. The vehicular foot-operated parking brake control apparatus according to claim 6, wherein the bracket includes an abutting portion which engages the release lever when the pedal arm moves from the parking brake engaging position to the parking brake disengaging position to rotate the release lever from the release rotational position to the non-release rotational position.

9. The vehicular foot-operated parking brake control apparatus according to claim 6, wherein the elongated hole is provided in the pawl.

10. The vehicular foot-operated parking brake control apparatus according to claim 9, wherein the pawl has a long arm extending generally at a right angle with respect to a direction of elongation of the elongated hole, the first end of the spring being connected to the long arm of the pawl.

11. The vehicular foot-operated parking brake control apparatus according to claim 6, wherein the ratchet teeth are formed on a member that is fixed to a lower part of the mounting bracket by a connection pin.

12. The vehicular foot-operated parking brake control apparatus according to claim 6, wherein the pedal arm includes a main pedal arm and an auxiliary pedal arm connected to one another by a connection pin.

13. The vehicular foot-operated parking brake control apparatus according to claim 12, wherein the pawl is mounted on the pedal arm by way of the connection pin.

14. The vehicular foot-operated parking brake control apparatus according to claim 13, wherein the elongated hole is provided in the pawl and the connection pin is positioned in the elongated hole.

15. The vehicular foot-operated parking brake control apparatus according to claim 12, wherein the release lever is mounted on the pedal arm by way of the connection pin.

* * * * *